Sept. 4, 1934.  W. H. SHAFFER, JR  1,972,361
REENFORCEMENT MESH
Filed July 28, 1932

INVENTOR
William H. Shaffer, Jr,
By Archworth Martin,
Attorney.

Patented Sept. 4, 1934

1,972,361

UNITED STATES PATENT OFFICE 1,972,361

REENFORCEMENT MESH

William H. Shaffer, Jr., Pittsburgh, Pa., assignor to Pittsburgh Steel Company, Pittsburgh, Pa., a corporation of Pennsylvania Application July 28, 1932, Serial No. 625,300

1 Claim. (Cl. 72—71)

My invention relates to reenforcement mesh that is particularly adapted for use in the building of floors, walls, ceilings, etc., where reenforcement is desired for a body or slab of concrete, stucco material, plaster, or the like.

For convenience of description, the invention will hereinafter be described more particularly as employed in the making of floors.

My invention relates more particularly to that class of structures wherein a wire mesh reenforcement is employed for plastic material such as concrete, plaster, etc., backed by a form sheet. Difficulty is sometimes experienced in stretching and supporting the mesh and the backing sheet against sagging, previous to and during the application of the plastic material thereto, and my invention has for one of its objects the provision of a reenforcement mesh structure of such form that undue sagging or stretching thereof under the pressure of the plastic material is avoided, and a mesh structure that will tend to lie flat when placed against a supporting framework.

Another object of my invention is to provide a combined mesh and form sheet structure that is inexpensive and which can be conveniently assembled.

Figure 1:
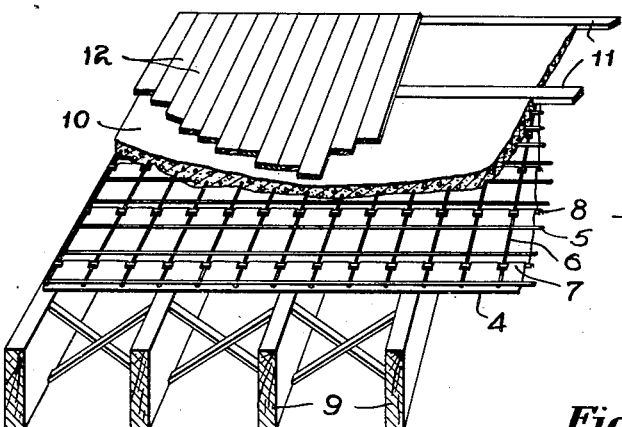
Figure 2:
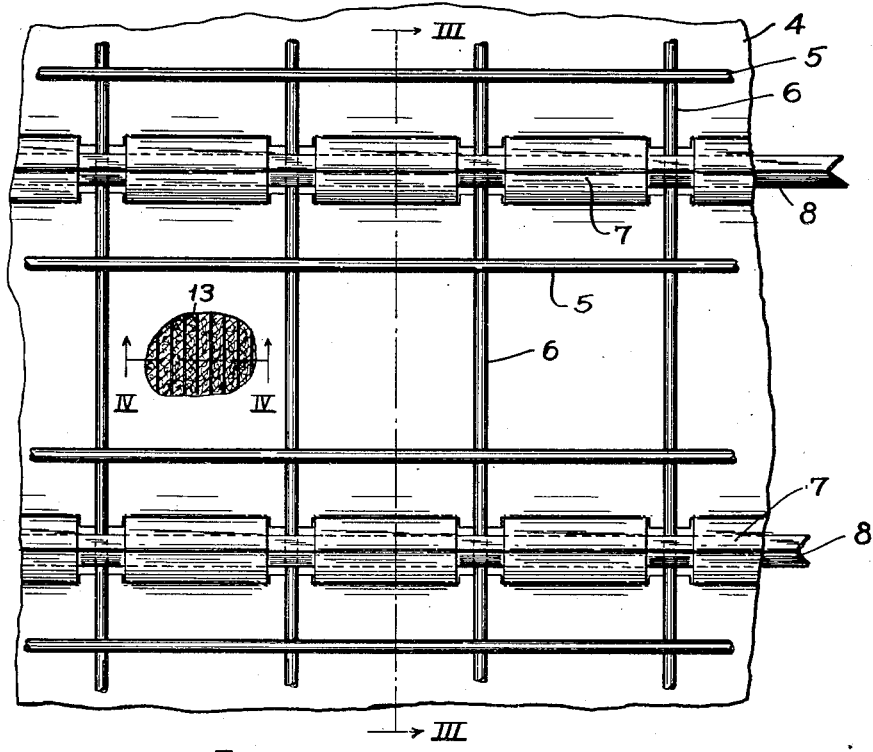
Figure 3:
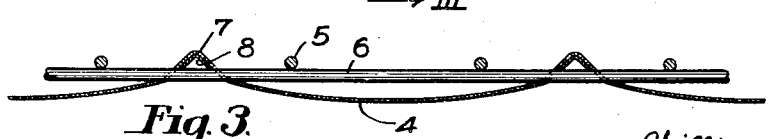
Figure 4:

One manner in which my invention may be practised is shown in the accompanying drawing wherein Figure 1 is a fragmentary perspective view of a floor structure; Fig. 2 is a face view of the reenforcement or plaster ground shown in Fig. 1; Fig. 3 is a view taken on the line III—III of Fig. 2, and Fig. 4 is an enlarged view taken on the line IV—IV of Fig. 2.

Referring first more particularly to Figs. 2 and 3, the plaster ground is composed of a backing sheet 4 consisting of one or more layers, against the face of which is placed a wire mesh composed of strand bars or wires 5, and stay wires 6, the wires or rods 5 and 6 being welded together at their points of intersection and constituting the reenforcement for the plastic material which is to be applied thereto. At certain points between the strand wires 5, the sheet 4 is slit and portions 7 are deflected upwardly therefrom to a plane in front of the wire mesh. Thereupon retaining bars 8 are slid between the outer sides of the wires 6 and the rear sides of the deflected sheet portions 7, thereby retaining the form sheet 4 and the mesh in assembled relation. The bars 8 are shown as of V form in cross section in order to give them considerable stiffness and strength for a given weight of material. It will be understood that the sheet 4 may be of paper, wire cloth, or other suitable material.

As shown in Fig. 1, the plaster ground structure of Fig. 2 is placed upon floor sills 9. The V bars 8 serve to stiffen the reenforcement structure and prevent sagging thereof between the floor sills 9. A layer of plaster 10 is then placed upon the sheet 4, imbedding the wire mesh. Upon this first layer of plaster, sleepers 11 may be placed, if a wood floor is desired instead of a concrete floor, an additional concrete or other plaster material is placed on the first layer thereof at points between the sleepers 11. The flooring boards 12 can then be nailed to the sleepers.

In order that the paper may have greater tensile strength, and so that it will not deform readily, I provide reenforcing strands 13 therein of string-like material such as cotton cord, hemp fibers, light wire, etc., the said strands being imbedded in the paper during the course of manufacture thereof, or placed between connected layers of paper or other sheet material. These strands extend crosswise with respect to the bars 8, and are present in the deflected portions 7 of the paper. It will be seen that the deflected portions 7 overlie some of the wires 5, but only certain ones of said wires. Certain of the wires 5 and adjacent portions of the wires 6 may therefore become completely imbedded in the concrete. Also, certain of the deflected portions 7 may be omitted, depending upon the strength and stiffness of the paper, and the weight of the plastic material to be placed thereon.

For walls and ceilings, the points of connection at 7 between the paper and the wire mesh need not be so numerous as in the case of a floor, because pressure and weight of the material is not so great as when building floors.

The strand wires 5 are disposed against the outer sides of the stay wires 6 as are also the retaining bars 8. For this reason, the sheet 4 will lie farther to the rear of the wires 5, and permit better imbedment thereof by the plastic material than if said strands were disposed against the rear sides of the wires 6.

I claim as my invention:—

Fabric structure comprising a mesh composed of strand and stay members, a form sheet disposed behind said mesh and having portions deflected to the front thereof, retaining bars interposed between the rear sides of said deflected portions and the face of the fabric, and reenforcing strands formed unitarily with said form sheet and extending transversely of the retaining bars.

WILLIAM H. SHAFFER, Jr.